(No Model.)
S. H. B. COCHRANE.
NUT LOCKING WASHER FOR BOLTS.
No. 435,345. Patented Aug. 26, 1890.
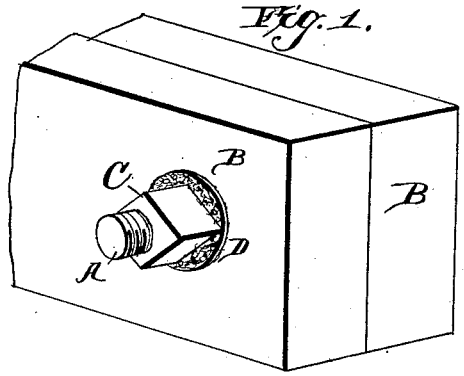
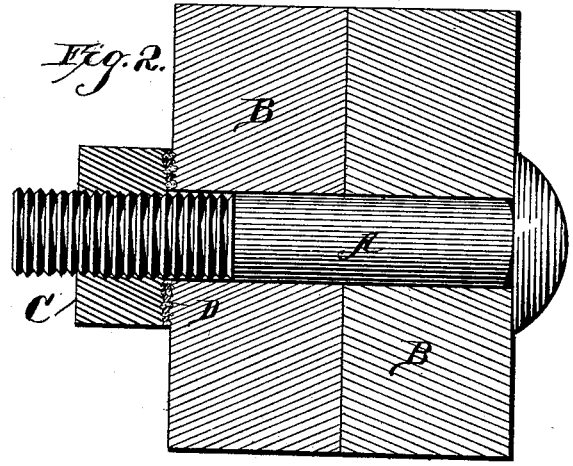
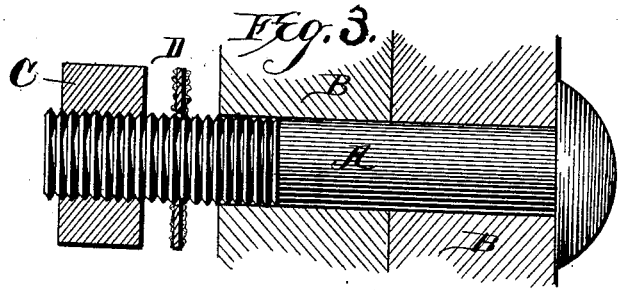
Witnesses
Henry G. Dieterich
Wm. Bagger
Inventor
Seabird H. B. Cochrane
By his Attorneys

UNITED STATES PATENT OFFICE.

SEABIRD HARRISON BYRON COCHRANE, OF TROY, OHIO, ASSIGNOR OF ONE-HALF TO JACOB M. FRIEDLICH, OF SAME PLACE.

NUT-LOCKING WASHER FOR BOLTS.

SPECIFICATION forming part of Letters Patent No. 435,345, dated August 26, 1890.

Application filed March 8, 1889. Serial No. 302,479. (No model.)

*To all whom it may concern:*

Be it known that I, SEABIRD HARRISON BYRON COCHRANE, a citizen of the United States, residing at Troy, in the county of Miami and State of Ohio, have invented a new and useful Improvement in Nut-Locking Washers for Bolts, of which the following is a specification.

This invention relates to nut-locking washers for bolts; and it has for its object to provide a device of this class, which shall be simple in construction, and which may be easily applied to any ordinary nut and bolt in such a manner as to secure the nut firmly and prevent it from working loose.

With these ends in view the invention consists in certain improvements in the washer, which will be hereinafter fully described, and particularly pointed out it the claim.

In the drawings, Figure 1 is a perspective view of a washer having my improvements applied in position for operation. Fig. 2 is a sectional view of the same. Fig. 3 is a sectional view taken vertically through a bolt nut and washer, illustrating the operation of my invention.

The same letters refer to the same parts in all the figures.

A designates a bolt of ordinary construction, which passes through the plates B B, which are to be secured together, and C designates the nut.

D is a washer, which is constructed of soft metal, and which is coated on one or both sides with sand, emery, broken glass, or other suitable hard abrasive material. This washer is in practice interposed between the nut and its bearing, with the result that when the nut is tightened upon the bolt the abrasive material is forced through the washer, burying itself in the face of the nut and in the plate or other substance which is to be secured, while the soft metal, of which the washer is composed, expands so as to form a filling between the particles, so that the whole will form a solid and compact body, whereby the nut is retained safely in position and prevented from unscrewing.

Having thus described my invention, I claim—

A nut-locking washer constructed of soft metal and having its face or faces coated with abrasive material, substantially as set forth.

In testimony that I claim the foregoing as my own, I have hereto affixed my signature, in presence of two witnesses.

SEABIRD HARRISON BYRON COCHRANE.

Witnesses:
L. K. RONEY,
J. W. ROTHERMEL.